(12) United States Patent
Blakesley

(10) Patent No.: US 6,209,915 B1
(45) Date of Patent: Apr. 3, 2001

(54) SEAT BELT TENSION SENSOR

(75) Inventor: Patrick B. Blakesley, Goshen, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/574,187

(22) Filed: May 18, 2000

Related U.S. Application Data

(63) Continuation-in-part of application No. 09/441,350, filed on Nov. 15, 1999.

(51) Int. Cl.[7] .................................................. B60R 22/18
(52) U.S. Cl. ........................ 280/801.1; 280/735; 297/468
(58) Field of Search ............................ 280/801.1, 808, 280/735; 297/468, 470, 471, 472, 482

(56) References Cited

U.S. PATENT DOCUMENTS 6,081,759 * 6/2000 Husby et al. ........................... 701/45

6,151,540 * 11/2000 Anishetty .............................. 701/45

FOREIGN PATENT DOCUMENTS

99/12012 * 3/1999 (WO) .

* cited by examiner

Primary Examiner—Paul N. Dickson
(74) Attorney, Agent, or Firm—Mark P. Bourgeois; Mark W. Borgman

(57) ABSTRACT

A vehicle seat belt tension sensor for detecting the magnitude of tension in a seat belt when an occupant is in the seat. A limit structure is attached between a vehicle member and the seat belt. A sensor is attached to the limit structure to generate an electrical signal in response to the sensor being placed in tension. The electrical signal changes as a function of tension on the seat belt. The limit structure moves between a first position in which the sensor carries all of the seat belt tension and a second position in which the limit structure carries all of the seat belt tension.

17 Claims, 3 Drawing Sheets

SEAT BELT TENSION SENSOR

CROSS REFERENCE TO RELATED AND CO-PENDING APPLICATIONS

This application is a continuation in part of U.S. patent application Ser. No. 09/441,350, filed Nov. 15, 1999 and titled, "Automobile Seat Having Seat Supporting Brackets with a Stepped Weight Sensor".

This application is related to the following U.S. patent applications:

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

The foregoing patents have the same assignee as the instant application and are herein incorporated by reference in their entirety for related and supportive teachings.

BACKGROUND OF THE INVENTION

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to force which causes dimensional changes of the resistor.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation.

Unfortunately there are several problems with detecting seat occupant weight. For example, when a seat occupant puts on a seat belt, the force of cinching down the seat belt on the occupant can cause a seat weight sensor to have false and erroneous readings. In another example, if a child's car seat is cinched down tightly in the car seat, it can appear to the weight sensor that a heavy person is in the seat, which is the wrong reading.

A current unmet need exists for a reliable, low cost, simple and robust seat belt tension sensor that can be used to input additional seat occupant information to an airbag controller to control airbag deployment.

SUMMARY OF THE INVENTION

It is a feature of the invention to provide a reliable and cost-effective vehicle seat belt tension sensor for detecting the magnitude of tension in a seat belt when an occupant is in the seat.

An additional feature of the invention is to provide a seat belt tension sensor for attachment to a seat belt in a vehicle. The seat belt tension sensor includes a limit structure that is attached between a vehicle member and the seat belt. A sensor is attached to the limit structure to generate an electrical signal in response to the sensor being placed in tension. The electrical signal changes as a function of tension on the seat belt. The limit structure moves between a first position in which the sensor carries all of the seat belt tension and a second position in which the limit structure carries all of the seat belt tension.

Another feature of the invention is to provide a seat belt tension sensor for attachment to a seat belt in a vehicle. A stationary slide is attached to a vehicle member and has a pair of rails extending outwardly from the stationary slide. A movable slide is located adjacent the stationary slide and is in engagement with the rails. A sensor is attached to the stationary slide and the moveable slide for generating an electrical signal in response to the sensor being placed in tension. The electrical signal changes as a function of tension on the seat belt. A collar is located in the travel limit aperture. A fastener extends through the sensor, the collar and is threadably engaged with the moveable slide. The moveable slide moves between a first position in which the sensor carries all of the seat belt tension and a second position in which the slides carry all of the seat belt tension.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
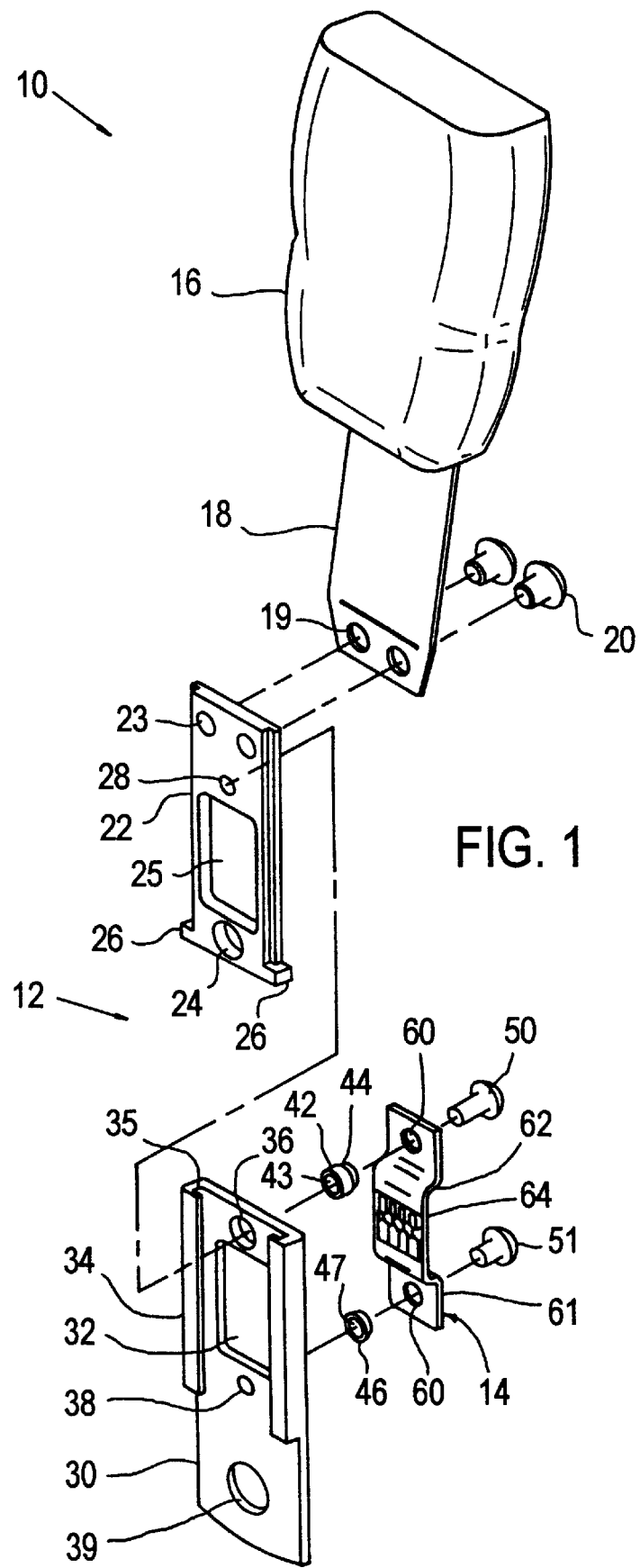
FIG. 1 is a perspective exploded view of the preferred embodiment of a seat belt tension sensor.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENTS

Figure 2:
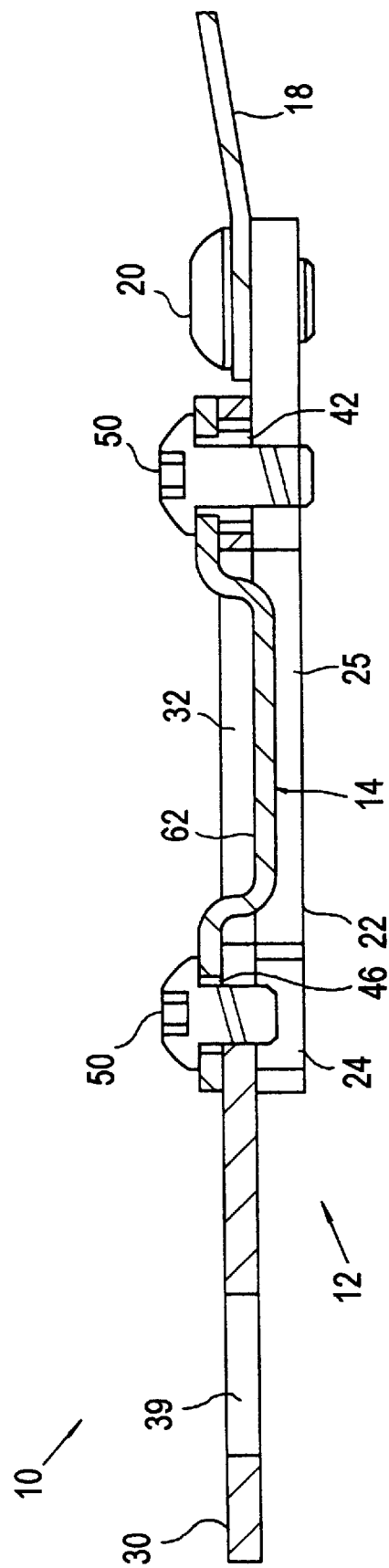
FIG. 2 is a cross-sectional view of FIG. 1 in an assembled state.
Figure 3:
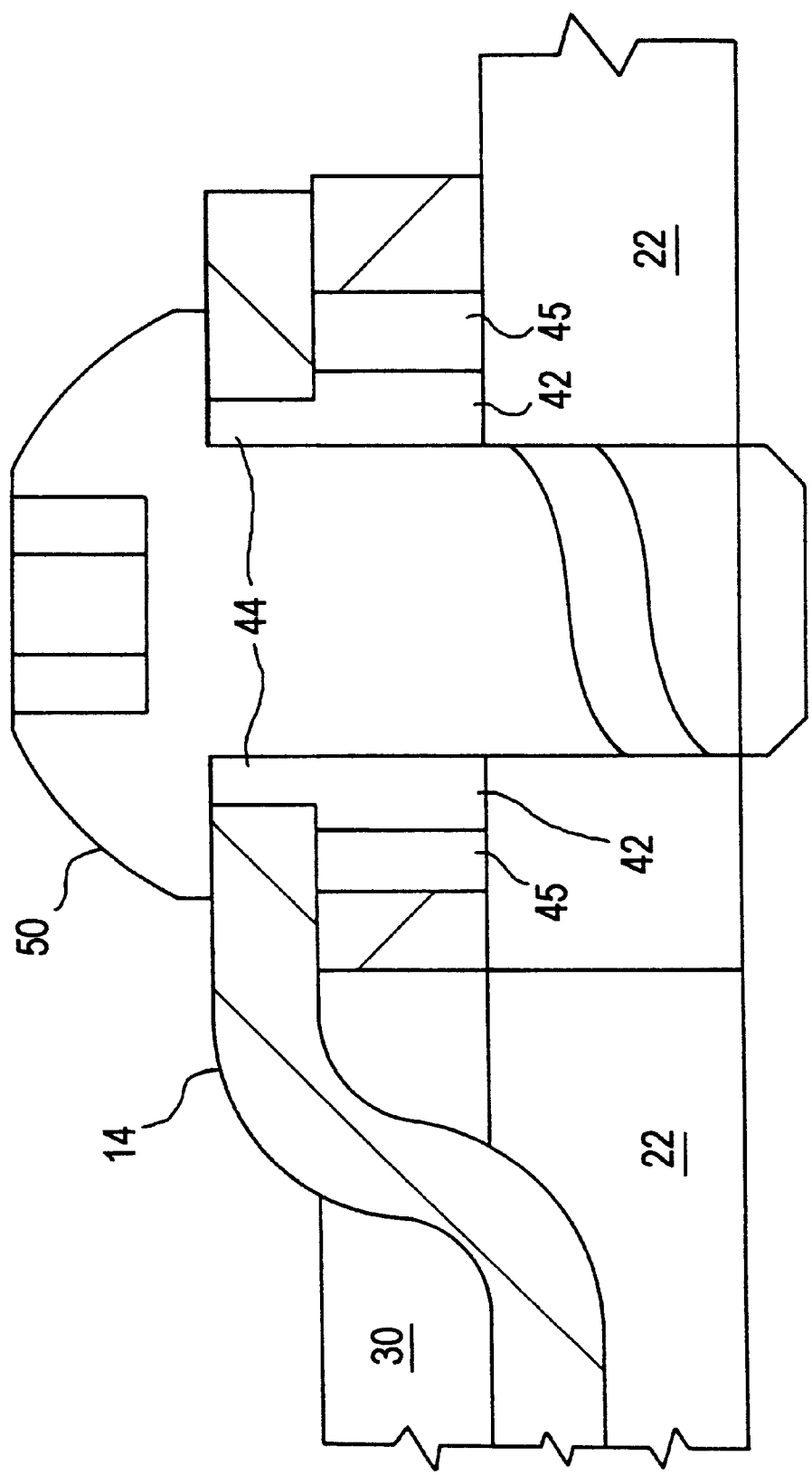
FIG. 3 is an enlarged view of FIG. 2 showing details around the collar.

The present invention is a seat belt tension sensor. Referring to FIGS. 1, 2 and 3 there is a seat belt tension sensor assembly 10 shown. Assembly 10 has a limit structure 12 and a sensor 14. Limit structure 12 is fastened between seat belt components. For example, structure 12 can be attached on one end to seat belt buckle 16 and on the other end to a vehicle seat or floor (not shown). Buckle 16 has a buckle plate 18 extending from one end. Buckle 16 typically is the receiving end of the seat belt. The belt webbing is extended and a metal end (not shown) clicks into buckle 16. Buckle 16 is attached to moveable slide 22 by fasteners 20 passing through holes 19 and 23. Fasteners 20 can be screws, bolts or rivets. If fastener 20 is a screw or bolt, then holes 23 could be threaded.

Moveable slide 22 is generally planar and has a sensor slot 25 extending therethrough. A threaded travel limit hole 28 is located between holes 23 and slot 25. A clearance hole 24 is located at the other end of slide 22. A pair of tabs 26 extend away from the moveable slide on each side.

A stationary slide 30 is also generally planar and has a sensor slot 32 extending therethrough. A pair of rails 34 are located on sides of slide 30 and each have a groove 35 therein. Moveable slide 22 fits into and is slidably engaged with rails 34. A travel limit aperture 36 is located at one end of slide 30. A mounting hole 39 is located at the other end of slide 30. Mounting hole 39 is used to attach slide 30 to a vehicle member such as a car floor or a car seat. A threaded aperture 38 is located between hole 39 and slot 32.

A circular stepped collar 42 fits into travel limit aperture 36. Stepped collar 42 has a flange 44 with a smaller outside diameter than collar 42. Flange 44 fits into one of sensor holes 60. Collar 42 has a passage 43 passing therethrough. A circumferencial gap 45 is formed between collar 42 and stationary slide 30.

A circular straight collar 46 fits into the other sensor hole 60. Collar 43 has a passage 47 passing therethrough.

After assembly, threaded fastener 50 extends through sensor hole 60, passage 43, travel limit aperture 36, and mates with threads in travel limit hole 28.

After assembly, threaded fastener 51 extends through sensor hole 60, passage 47 and mates with threads in threaded hole 38. Fasteners 50 and 51 are conventional fasteners such as hex headed bolts, Allen head screws, shoulder screws or rivets.

Strain gauge sensor 14 has a metal substrate 61. Metal substrate 61 is preferably formed from 430 stainless steel. Substrate 61 has an offset section 62. Several strain gage resistors 64 are arranged on substrate 61 within section 62. Details of the construction and operation of resistors 64 are shown U.S. patent application Ser. No. 09/441,350, filed Nov. 15, 1999 and titled, "Automobile Seat Having Seat Supporting Brackets with a Stepped Weight Sensor".

Resistors 64 would typically be connected in a conventional bridge configuration. Resistors 64 are strain sensitive and will change resistance based on the amount of strain in substrate 61. A wiring harness (not shown) would typically connect resistors 64 to an external electrical circuit.

When an occupant sits in a vehicle seat and buckles a seat belt, the tension placed in the seat belt is transferred from buckle plate 18 to moveable slide 22, sensor 14, stationary slide 34 and then to the vehicle floor or seat frame. An electrical output signal is generated by the resistors 64 in sensor 14 that is proportional to the magnitude of the tension in the seat belt and is transmitted over a wire harness (not shown) to a conventional air bag controller (not shown). The air bag controller then can use the seat belt tension information to compute a more accurate profile of the seat occupant and use that information to control deployment of the airbag. This is the normal operational state of the seat belt tension sensor in which all of the seat belt tension is carried through the sensor 14.

In a situation where the vehicle is involved in a crash, the seat belt tension sensor operates in a different mode called a high load or crash state. In the high load state, the slides carry all of the tension placed on the seat belt. The amount of tension in the seat belt in a crash situation is much larger than in normal operation. If the substrate 61 of the sensor was designed to carry all of this tension, it would not flex enough to properly function as a strain gage sensor. Therefore, in a crash situation, the slides engage and carry the tension through the much stronger limit structure 12. As the tension in the seat belt increases, the sensor 14 flexes until moveable slide 22 engages collar 42 eliminating one side of gap 45 providing a positive stop. The seat belt tension is then transferred through buckle plate 18 to moveable slide 22, collar 42, fastener 50, stationary slide 34 and then to the vehicle floor or seat frame. The limit structure 12 is designed so as not to deform under the load placed on it by the seat occupant during a crash situation. Tabs 26 are designed as a secondary stop mechanism and provide extra strength to the limit structure 12. Tabs 26 engage the end of rails 34 providing a secondary positive stop.

Remarks About the Preferred Embodiment

The seat belt tension sensor has several advantages. It allows accurate sensing of seat belt tension, while at the same time providing the structural strength needed for occupant restraint in a crash situation. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

Variations of the Preferred Embodiment

The sensor 14 shown was several strain gage resistors, one skilled in the art will realize that the preferred embodiment would work with other types of sensors. For example, discrete chip resistors could be attached to substrate 61 or foil type strain gages. Furthermore, the shape of substrate 61 could be varied to any configuration that would transfer the weight from the seat belt.

Although sensor assembly 10 was shown without a housing, it is contemplated to add a housing.

Another variation of the seat belt tension sensor would be to utilize other electrical connections other than a wire harness. For example, a connector or terminals could be added.

Yet, a further variation, would be to place signal conditioning circuitry on substrate 61 or on limit structure 12 to amplify and filter the electrical signal before it is transmitted to the airbag controller.

The seat belt tension sensor shown was mounted between a seat belt and a vehicle member. One skilled in the art will realize that the preferred embodiment could be mounted to various locations on the seat or vehicle interior. For example, the seat belt tension sensor could be attached to the vehicle roof.

The illustrated embodiment showed the use of the seat belt tension sensor in an automobile seat. It is contemplated to utilize the seat belt tension sensor in other occupant sensing applications such as chairs, sofas, scales, beds and mattresses, hospital equipment, cribs, airplane seats, train seats, boat seats, amusement rides, and theater seats, The illustrated embodiment showed the use of tabs 26 as a secondary positive stop. It is contemplated to omit tabs 26 and utilize the collar 42 and fastener 50 as the only stop. Alternatively, it is contemplated to omit collar 42 and fastener 50 and use tabs 26 as the only stop.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for attachment to a seat belt in a vehicle comprising:
   a) a stationary slide attachable to the vehicle including:
   a1) a sensor slot;
   a2) a travel limit aperture;
   a3) a pair of rails extending outwardly from the stationary slide;
   b) a movable slide disposed adjacent the stationary slide and in engagement with the rails, the moveable slide having a travel limit hole;
   c) a sensor attached to the stationary slide and the moveable slide, the sensor extending into the sensor slot for generating an electrical signal in response to the sensor being placed in tension, the electrical signal changing as a function of tension on the seat belt;
   d) a first collar located in the travel limit aperture; and
   e) a first fastener extending through the sensor, the collar and engaged with the moveable slide, the moveable slide movable between a first position in which the sensor carries all of the seat belt tension and a second position in which the slides carry all of the seat belt tension.

2. The seat belt tension sensor according to claim 1, wherein a gap is formed between the stationary slide and the first collar.

3. The seat belt tension sensor according to claim 1, wherein a second fastener attaches the sensor to the stationary slide.

4. The seat belt tension sensor according to claim 1, further comprising a second collar located in the sensor.

5. The seat belt tension sensor according to claim 1, wherein an electrical connector is attached to the sensor for electrically connecting an external circuit to the sensor.

6. The seat belt tension sensor according to claim 1, wherein the sensor is at least one strain gauge sensor.

7. The seat belt tension sensor according to claim 1, wherein at least one tab extends from the moveable slide and is engagable with at least one of the rails to provide a stop.

8. A seat belt tension sensor for attachment to a seat belt in a vehicle comprising:
   a) limit structure attachable between a vehicle member and a seat belt; and
   b) a sensor attached to the limit structure, for generating an electrical signal in response to the sensor being placed in tension, the electrical signal changing as a function of tension on the seat belt, the limit structure movable between a first position in which the sensor carries all of the seat belt tension and a second position in which the limit structure carries all of the seat belt tension.

9. The seat belt tension sensor according to claim 8, wherein the limit structure comprises:
   a) a stationary slide attachable to a vehicle member, the stationary slide having a travel limit aperture and a pair of rails extending outwardly from the stationary slide;
   b) a movable slide disposed adjacent the stationary slide and in engagement with the rails, the moveable slide having a travel limit hole;
   c) a sensor attached to the stationary slide and the moveable slide for generating an electrical signal in response to the sensor being placed in tension, the electrical signal changing as a function of tension on the seat belt;
   d) a first collar located in the travel limit aperture; and
   e) a first fastener extending through the sensor, the collar and engaged with the moveable slide, the moveable slide movable between a first position in which the sensor carries all of the seat belt tension and a second position in which the slides carry all of the seat belt tension.

10. The seat belt tension sensor according to claim 8, wherein the vehicle member is a vehicle floor.

11. The seat belt tension sensor according to claim 8, wherein the vehicle member is a seat frame.

12. The seat belt tension sensor according to claim 8, wherein the first position corresponds to a normal vehicle operation state.

13. The seat belt tension sensor according to claim 8, wherein the second position corresponds to a high load state.

14. The seat belt tension sensor according to claim 8, wherein the sensor is at least one strain gauge.

15. The seat belt tension sensor according to claim 9, wherein at least one tab extends from the moveable slide and is engagable with at least one of the rails to provide a stop.

16. A seat belt tension sensor for attachment to a seat belt in a vehicle comprising:
   a) a stationary slide attachable to a vehicle member and having a pair of rails extending outwardly from the stationary slide;

b) a movable slide disposed adjacent the stationary slide and in engagement with the rails;

c) a sensor attached to the stationary slide and the moveable slide for generating an electrical signal in response to the sensor being placed in tension, the electrical signal changing as a function of tension on the seat belt;

d) a first collar located in the travel limit aperture; and e) a first fastener extending through the sensor, the collar and engaged with the moveable slide, the moveable slide movable between a first position in which the sensor carries all of the seat belt tension and a second position in which the slides carry all of the seat belt tension.

17. The seat belt tension sensor according to claim 16, wherein a gap is formed between the stationary slide and the first collar.

* * * * *